J. F. IRELAND.
TROLLEY POLE AND WHEEL.
APPLICATION FILED DEC. 10, 1909.
1,069,014.
Patented July 29, 1913.
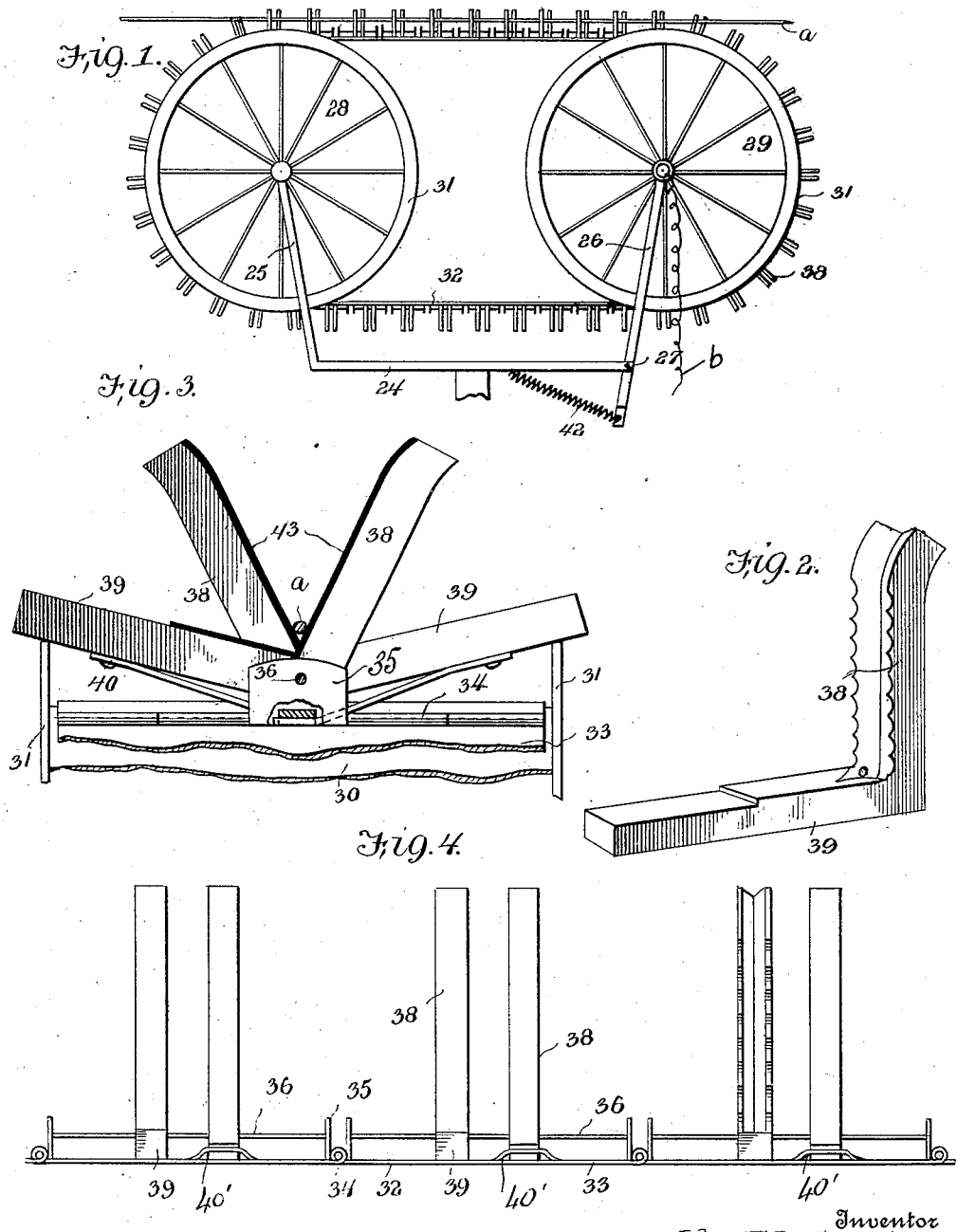
Inventor
John F. Ireland.
Witnesses
William Smith
M. F. Gannett
By Victor J. Evans
Attorney

UNITED STATES PATENT OFFICE.

JOHN F. IRELAND, OF PENNVILLE, INDIANA.

TROLLEY POLE AND WHEEL.

1,069,014.     Specification of Letters Patent.     Patented July 29, 1913.

Application filed December 10, 1909. Serial No. 532,452.

*To all whom it may concern:*

Be it known that I, JOHN F. IRELAND, a citizen of the United States, residing at Pennville, in the county of Jay and State of Indiana, have invented new and useful Improvements in Trolley Poles and Wheels, of which the following is a specification.

This invention relates to an improved trolley wire contacting device and embraces the construction of the particular designed endless chain and rotatable supports thereof, whereby a positive contact can be maintained with the trolley wire.

One of the objects of the invention is the provision of means whereby the engagement between the trolley wire and the pole carried elements engaging said wire is relatively fixed in that there is no sliding connection between the wire and the contacting member.

In the accompanying drawings,—Figure 1 is a side elevation of the trolley engaging devices constructed in accordance with my invention. Fig. 2 is a detail, perspective view of one member of one of the trolley engaging clamps. Fig. 3 is a detail, transverse, sectional view of a portion of one of the trolley wheels, showing also a portion of the trolley chain thereon and a pair of the trolley-engaging clamps. Fig. 4 is a detail elevation of the trolley chain and several pairs of the trolley wire-engaging clamps.

My improved device is arranged upon a suitable trolley pole preferably formed with yielding sections, and is connected to the trolley pole by means of a fork 24.

The trolley fork 24 has a fixed upwardly extending arm 25 and a pivoted arm 26, the pivot of which is indicated at 27, said arms being respectively provided with bearings for a pair of trolley wheels 28—29 each of which has its rim formed with a peripheral groove 30 and with side flanges 31 at the sides of said groove. An endless chain 32 connects the trolley wheels together and engages the peripheral grooves thereof and lies between the flanges 31. The several links 33 of the chain are hinged together as at 34 and each is provided with a pair of outstanding ears 35 connected together by a pin or rod 36 which forms the pivot for a pair of trolley clamps 37 each of which comprises a jaw 38 and an operating arm 39, the said trolley clamps being disposed in reversed relation so that the jaws 38 open toward and from each other on the pivot 36 and the arms 39 extend laterally beyond the sides of the chain links to a sufficient extent to cause them when they reach one of the wheels to be engaged by the flanges 31 thereof and moved angularly thereby in the required direction to cause the jaws 38 to open. Each chain link also has on its outer side a pair of springs 40 which are connected to the said link and also to the arm 39 of one of the chains, the function of the said springs being to close the jaws of the clamps against opposite sides of the trolley wire $a$ above the upper lead of the endless trolley chain. The central portions of the springs are confined against said chain by the loops 40' which are adapted to retain said springs in operative position thereon. The chain is made of conducting material which is also true of the trolley clamps and at least of the trolley wheel 29, the electric conductor $b$ being connected to the arm 26 at the bearing of the said wheel 29. A spring 42 is connected to the trolley fork and to the lower extended portion of the arm 26 and acts to move the trolley wheel 29 a sufficient distance from the trolley wheel 28 to keep the trolley chain under tension. A sufficient number of the jaws of the trolley clamps are left bare to insure electrical contact and connection with the trolley wire at all times and other of the trolley clamps may be, and are here shown as having their engaging faces covered by non-conducting material as at 43.

In connection with the engagement between the trolley wire and the chain carried members, it is to be noted that said wire is clamped by the members between the flanges 31, so that the connection between the chain and wire may be said to be a fixed connection, particularly in that there is no sliding connection between the wire engaging member and the wire. All wear of the wire incident to such sliding connection is thus avoided. Therefore the only frictional wear in the device is at the hub of the trolley wheels, and as this part can be readily protected by any of the usual anti-frictional devices against undue wear, the life of the device is materially increased as is also the life of the wire. The clamps automatically open to receive the wire at one end of the operative phase of the chain and automatically release the wire at the opposing end. Certainty of operation is thus insured and a most effective electrical contact secured by means of the relatively greater length of the engaging surfaces of the chain as compared with the ordinary trolley wheel.

While the device is described for use on electrically propelled vehicles it is to be understood that I contemplate its use in connection with any track traveling vehicle in which the device will serve as a means for establishing communication, by telephone or telegraph, between such vehicle at any distant point.

Having thus described the invention, what is claimed, is:—

1. A trolley head having a pair of trolley wheels one in advance of the other and each provided with peripheral flanges, an endless chain engaging the peripheries of said wheels, trolley-engaging clamps mounted on said chain and having operating arms for engagement by the flanges of said wheels to move said clamps in one direction and springs to move said clamps in the reverse direction.

2. A trolley wire-engaging member including rotatable supports and an endless element arranged for travel thereon, and clamps carried by said element to engage the wire and secure said element and wire in relatively fixed connection.

3. A trolley engaging element comprising rotatable supports, a chain mounted for travel thereon, and wire clamping bars carried by the chain and operative to clamp the wire to the chain.

4. A trolley engaging member comprising spaced rotary elements, an endless chain adapted for travel about said elements, and wire clamping means carried by said chain.

5. A trolley engaging member comprising spaced rotary elements, an endless chain adapted for travel about said elements, and wire clamping means carried by said chain, said elements being formed to operate the wire-engaging means to permit their disconnection from the wire.

6. A trolley wire engaging member comprising spaced rotary elements, a chain connecting said elements, clamping arms arranged in pairs on said chain and normally adapted to clamp the wire between them, and means carried by each element to move the clamping arms to inoperative positions.

7. A trolley engaging member comprising spaced wheels, an endless chain traveling over said wheels with its operative section arranged in alinement with the trolley wire, wire clamping means arranged at determinate intervals throughout the length of the chain, and means carried by the respective wheels whereby the clamping means is successively moved to inoperative position at the respective ends of the operative section of the chain.

In testimony whereof I affix my signature in presence of two witnesses.

JOHN F. IRELAND.

Witnesses:
CHARLES H. IRELAND,
W. H. CHANDLER.

---

Copies of this patent may be obtained for five cents each, by addressing the "Commissioner of Patents, Washington, D. C."